United States Patent [19]
Bakx et al.

[11] Patent Number: 5,623,472
[45] Date of Patent: Apr. 22, 1997

[54] METHOD AND APPARATUS FOR RECORDING SIGNALS ON A RECORD CARRIER, MEASUREMENT METHOD AND MEASUREMENT DEVICE FOR USE IN THE RECORDING METHOD AND THE RECORDING APPARATUS, AND RECORD CARRIER

[75] Inventors: Johannes L. Bakx; Jeroen J. L. Horikx, both of Eindhoven, Netherlands

[73] Assignees: U.S. Philips Corp., New York, N.Y.; Philips and Du Pont Optical Co., Nieuwegein, Netherlands

[21] Appl. No.: 427,781

[22] Filed: Mar. 2, 1994

Related U.S. Application Data

[63] Continuation of Ser. No. 59,530, May 10, 1993, abandoned, which is a continuation of Ser. No. 925,231, Aug. 3, 1992, abandoned, which is a continuation of Ser. No. 510,912, Apr. 18, 1990, abandoned.

[30] Foreign Application Priority Data

May 29, 1989 [NL] Netherlands ............................ 8901345

[51] Int. Cl.$^6$ ................................ G11B 7/00; G11B 7/24; G11B 3/90
[52] U.S. Cl. ........................ 369/116; 369/275.2; 369/53
[58] Field of Search .................................... 369/116, 111, 369/100, 48, 93, 124, 275.1, 275.3, 275.4, 284, 121, 13, 54, 47; G11B 7/00, 7/24, 3/90

[56] References Cited

U.S. PATENT DOCUMENTS

| | | | |
|---|---|---|---|
| 4,327,430 | 4/1982 | Wada et al. | 369/43 |
| 4,486,791 | 12/1984 | Wada et al. | 358/342 |
| 4,872,078 | 10/1989 | Gerber et al. | 360/114 |
| 5,270,987 | 12/1993 | Kaku et al. | 369/13 |
| 5,278,814 | 1/1994 | Deguchi et al. | 369/47 |
| 5,321,672 | 6/1994 | Miyamoto et al. | 369/13 |

Primary Examiner—Thai Q. Tran
Assistant Examiner—Robert Chevalier
Attorney, Agent, or Firm—Richard A. Weiss

[57] ABSTRACT

An apparatus and method for recording an information signal on a record carrier by means of a radiation beam which produces optically detectable marks in parallel track portions thereon having a substantially constant track pitch (q). The write intensity of the radiation beam is adjusted to an optimum level which results in a width (p) of the optical marks which corresponds to the track pitch (q). The optimum intensity level is determined by recording different test signals in adjoining track portions at various write intensities of the radiation beam, reading-out the recorded test signals, and detecting therefrom the write intensity at which signal components of one test signal no longer occur in another recorded test signal. Recording at the optimum write intensity results in a minimum block error rate (BLER) upon read-out of the recorded information signal.

33 Claims, 6 Drawing Sheets

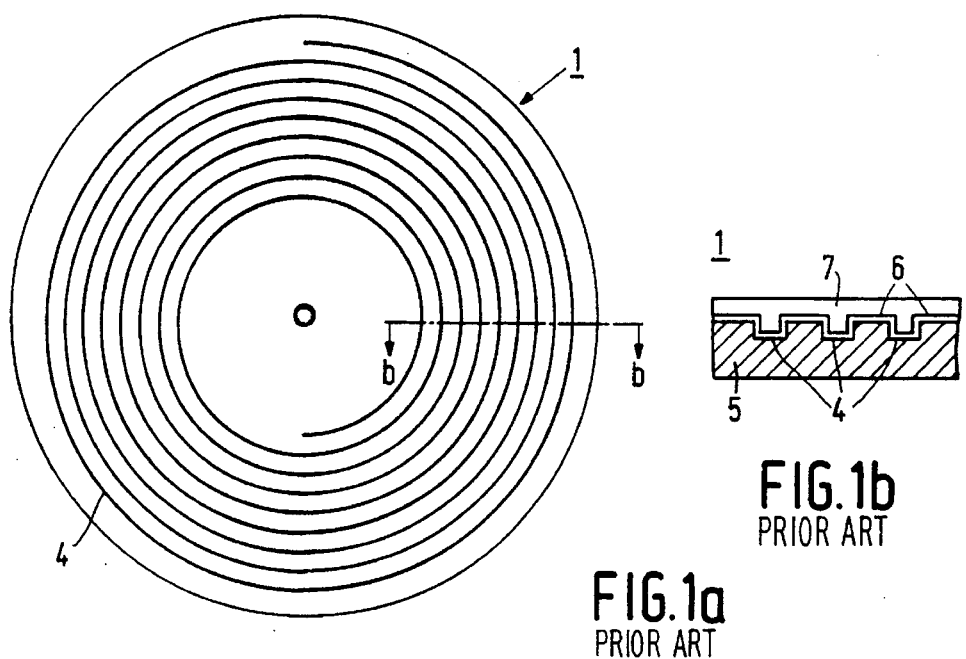
FIG.1b
PRIOR ART
FIG.1a
PRIOR ART
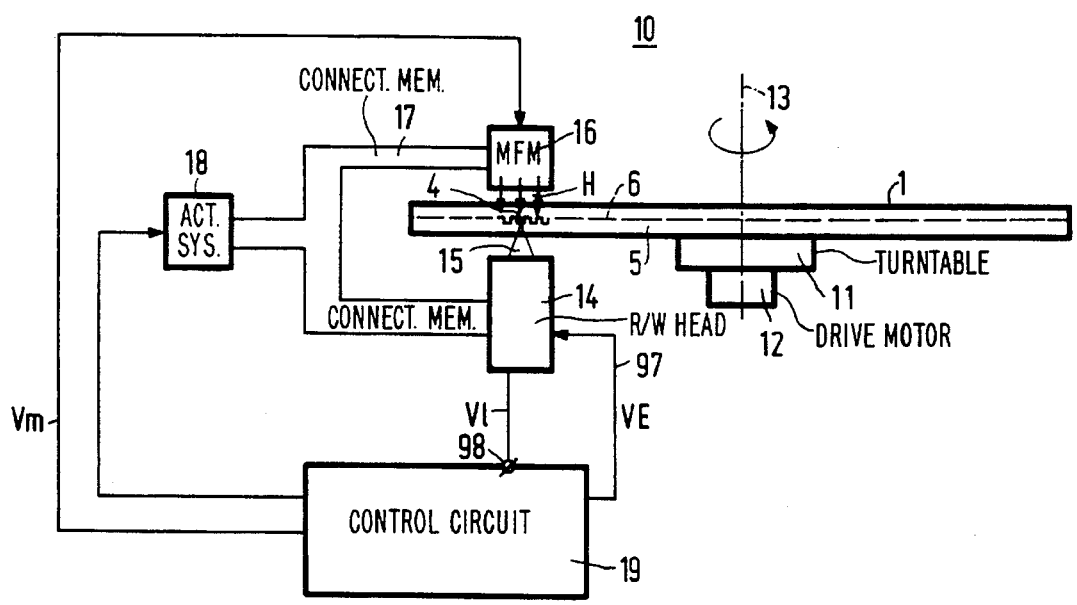
FIG.2

METHOD AND APPARATUS FOR RECORDING SIGNALS ON A RECORD CARRIER, MEASUREMENT METHOD AND MEASUREMENT DEVICE FOR USE IN THE RECORDING METHOD AND THE RECORDING APPARATUS, AND RECORD CARRIER

This is a continuation of application Ser. No. 08/059,530, filed on May 10, 1993 now abandoned, which is a continuation of application Ser. No. 07/925,231, filed Aug. 3, 1992 now abandoned, which is a continuation of application Ser. No. 07/510,912, filed Apr. 18, 1990 now abandoned.

BACKGROUND OF THE INVENTION

1. Field of the Invention

The present invention relates to a method of recording signals on a record carrier of a rewritable type in which information patterns of optically detectable marks are formed on the record carrier in substantially parallel track portions of a specific track pitch, the track portions being scanned by a radiation beam to form the marks.

The invention further relates to a recording apparatus for recording signals in parallel track portions of a specific track pitch on a record carrier of a rewritable type, which recording apparatus comprises scanner for scanning the track portions by means of a radiation beam to form an information pattern of optically detectable marks in the track portions, which pattern corresponds to the signals.

The invention still further relates to a measurement technique and an associated measurement device for advantageous use in the recording method and the recording apparatus.

Finally, the invention also relates to a record carrier provided with substantially parallel adjacent track portions of substantially constant track pitch, which track portions exhibit an information pattern of optically detectable marks.

2. Description of Related Art

Such a general recording method, recording apparatus and record carrier are known, inter alia, from "Philips Technical Review", Vol. 42, No. 2, pp. 28–47. That publication describes a magneto-optical recording apparatus. A problem in magneto-optical recording is that the read reliability of the recorded signal is susceptible to variations in the recording conditions, such as for example, the recording velocity and the intensity of the scanning beam.

SUMMARY OF THE INVENTION

It is an object of the invention to provide a recording method and recording apparatus of the type defined in the foregoing in which the read reliability of the recorded signal is improved.

As related to the method, this object is achieved by a method which is characterized in that the dimensions of the recorded marks in a direction perpendicular to the track portions direction substantially correspond to the track pitch.

With respect to the apparatus, this object is achieved by apparatus wherein the recording apparatus is adapted to record marks whose dimensions in a direction perpendicular to the track portions direction substantially correspond to the track pitch.

The invention is based on the recognition of the fact that the read reliability is functionally related to the dimensions of the recorded marks, an optimum read reliability being obtained when the dimensions of the marks in a direction perpendicular to the track portions direction are equal to the track pitch. Preferably, the dimensions of the marks are adjusted by adjusting the write intensity, for these dimensions depend greatly on the write intensity used in recording. Thus, the write intensity is very suitable for adjusting these dimensions.

An illustrative embodiment of the method, in which the write intensity can be optimized simply, is characterized in that the method comprises a measurement method. In that measurement method, a first test signal is recorded with a maximum write intensity of the radiation beam in a specific track portion. Then, in the specific track portion and situated at opposite sides of the specific track portion, a second test signal, which can be distinguished from the first test signal, is recorded with different write intensities between a minimum intensity and the maximum intensity. After the second test signal has been recorded, it is read from the specific track portion to check whether the second test signal being read contains signal components corresponding to the first test signal. On the basis of the results of the check, an optimum write intensity is selected which is situated in the boundary region between the intensity range for which signal components corresponding to the first test signal are present in the second test signal being read and the intensity range for which the signal components corresponding to the first test signal are substantially absent in the second test signal being read, the write intensity being adjusted to the optimum write-intensity value after the measurement method has been carried out.

An illustrative embodiment of the apparatus, in which the write intensity is optimized automatically, is characterized in that the apparatus comprises a measurement device comprising a reader for reading the recorded signals with the aid of a radiation beam; a test-signal-generator for generating a first test signal and a second test signal which can be distinguished from the first test signal; controller for causing the first test signal to be recorded in a specific track portion when a specific maximum value of the write intensity is reached, for subsequently causing the second test signals to be recorded in the specific track portion and in track portions situated at opposite sides of the specific track portion, with a number of different write-intensity values situated between a minimum intensity and the maximum intensity, and for causing the second test signals recorded with different write-intensity values to be read from the specific track portion; a detector for detecting signal components corresponding to the first test signal in the second test signals being read; a selector for deriving from the detected signal components an optimum write intensity which is situated substantially at the boundary between the intensity range for which signal components corresponding to the first test signal appear in the second test signals being read and the intensity range for which the signal components corresponding to the first test signal are substantially absent in the second test signals being read; and an adjuster for adjusting the write intensity to the optimum value after the optimum write intensity has been determined.

The foregoing illustrative embodiments of the method and the apparatus advantageously utilize the fact that at the instant at which the dimensions of the marks correspond to the track pitch the signal components of the first test signal disappear from the read signal.

The illustrative embodiments with automatic write-intensity adjustment are particularly suitable for use in recording apparatus in which the dimensions of the marks strongly depend on the write intensity, such as, for example, in magneto-optical recording apparatus. However, the invention is not limited to magneto-optical recording but may also be applied to other recording principles, such as, for example, recording on rewritable record carriers of the "phase-change" type, employing a record carrier whose structure can be changed from amorphous to crystalline and vice versa upon scanning with a radiation beam, depending on the irradiation method.

BRIEF DESCRIPTION OF THE DRAWING

Further embodiments and advantages thereof will now be described in more detail with reference to FIGS. 1 to 11, in which FIGS. 1a and 1b show a record carrier;

FIG. 2 shows a magneto-optical apparatus;

DETAILED DESCRIPTION OF THE PREFERRED EMBODIMENTS

Figure 3:
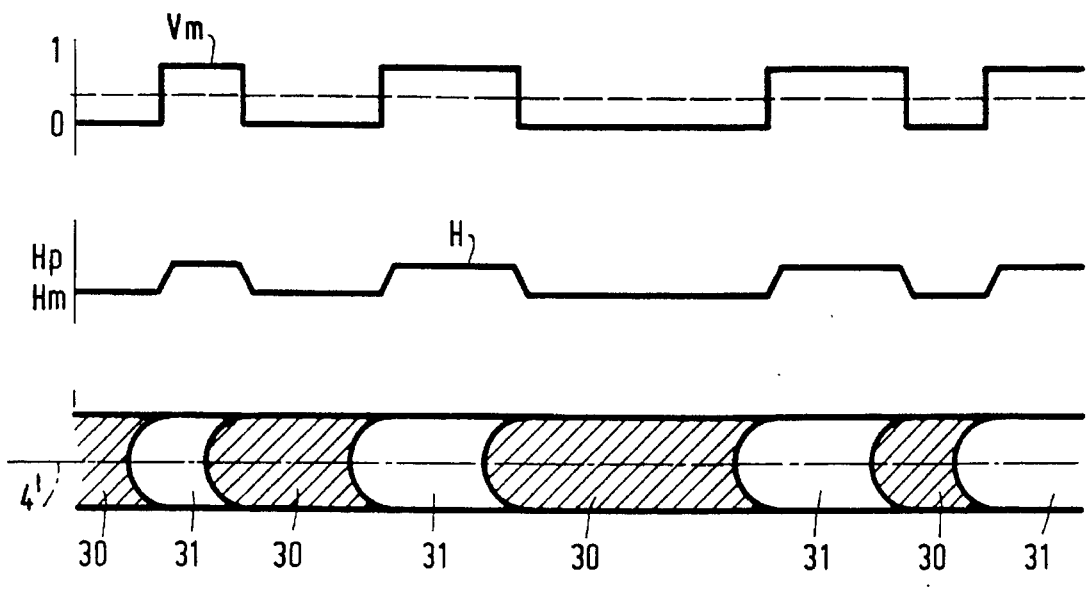
FIG. 3 shows a write signal and the corresponding information pattern.

FIGS. 1a and 1b show an embodiment of a record carrier 1 of a rewritable type, FIG. 1a being a plan view and FIG. 1b showing a small part in a sectional view taken on the line b—b. The record carrier has a pattern of track portions, which define substantially concentric information areas intended for recording information in the form of information patterns of optically detectable marks. The track portions pattern may comprise, for example, a continuous spiral servo track 4 defining the centers of the information areas. However, these concentric information areas may also be defined by, for example, a structure of servo patterns as described in Netherlands Patent Application NL-A 8702905. For the purpose of recording, the record carrier 1 comprises a recording layer 6 provided on a transparent substrate 5 and coated with a protective layer 7. The information layer 6 is composed of a material suitable for magneto-optical recording. However, it is to be noted that the information layer 6 may alternatively consist of other materials such as, for example, a "phase-change" material, whose structure can be changed from amorphous to crystalline and vice versa by suitable irradiation methods.

FIG. 2 shows an embodiment of a magneto-optical recording apparatus 10 for recording information on the record carrier 1. The recording apparatus 10 comprises a turntable 11 and a drive motor 12 to rotate the record carrier 1 about an axis 13. An optical write/read head 14 of a customary type suitably for magneto-optical recording and reading is arranged opposite the rotating record carrier 1 and directs a radiation beam 15 towards the recording layer 6. The recording apparatus 10 comprises a customary tracking device, not shown, for keeping the beam 15 directed at the servo track 4, a focusing means for keeping the radiation beam 15 in focus on the recording layer 6, and customary addressing device for locating a specific address, a for example, as described in European Patent Application EP-A 0265904 and Netherlands Patent Application NL-A 8800151. Opposite the read/write head 14, at the other side of the record carrier 1, a magnetic field modulator (MFM) 16 is arranged to generate a magnetic-field H which is oriented substantially perpendicularly to the recording layer 6 in the area of the recording layer 6 which is exposed to the radiation beam 15. The magnetic-field modulator 16 is rigidly connected to the read/write head 14 via a physical connecting member 17. The write/read head 14 and the magnetic-field modulator 16 are radially movable relative to the record carrier by means of an actuating system 18, the connecting member 17 ensuring that the magnetic-field modulator 16 remains always positioned directly opposite the read/write head. The magnetic-field modulator 16 is of a type for which the direction of the generated magnetic field can be modulated in conformity with a bivalent write signal Vm. Such a magnetic field modulator is described comprehensively in, inter alia Netherlands Patent Application no. 8702451, herewith incorporated by reference.

The apparatus 10 further comprises a control circuit 19 for controlling the write/read head 14 and the actuating system 18 and for controlling the generation of the write signal Vm. When information is recorded, the servo track 4 is scanned with the radiation beam 15 whose intensity is set to a write intensity which is adequate to heat the part of the recording layer 6 which is scanned by the radiation beam to a temperature near the Curie temperature of the material of the recording layer 16. At the same time, the write signal Vm, and hence the generated magnetic field H, is modulated in conformity with the information to be recorded, so that a pattern of marks in the form of magnetic domains in conformity with the write signal Vm is obtained in the part of the servo track 4 being scanned. The domains which are formed can be detected optically, as will be described in detail hereinafter.

By way of illustration, FIG. 3 shows the write signal Vm, the corresponding magnetic field H and the resulting pattern of magnetic domains having different directions of magnetization as a function of time. The domains of different directions of magnetization bear different reference numerals, namely 30 and 31. The center of the servo track in which the pattern is recorded is represented diagrammatically by a line 4'. The pattern of magnetic domains 30 and 31 can be read with the read/write head 14, which for this purpose scans the pattern with a beam of linearly polarized light. Upon reflection of the radiation beam the direction of polarization of the beam is rotated in a direction which is dictated by the direction of magnetization of the part of the recording layer 6 being scanned. This results in a modulation pattern of variations of the direction of polarization corresponding to the pattern of magnetic domains 30, 31 being scanned. This modulation is detected in a customary manner in the read/write head 14, for example, by means of a Wollaston prism, photoelectric transducers, and an amplifier which converts the output signals of the photoelectric transducers into a read signal V1 which is representative of the pattern being read, as is described, inter alia, in Netherlands Patent Application NL-A 8602304.

One of the principal aspects of recording is the reliability with which the recorded information can be read. A known parameter to express the read reliability for recorded CD signals is referred to as the "block error rate" (BLER). The parameter BLER specifies the number of EFM blocks per unit of time in which one or more errors have been detected during reading.

Figure 4:
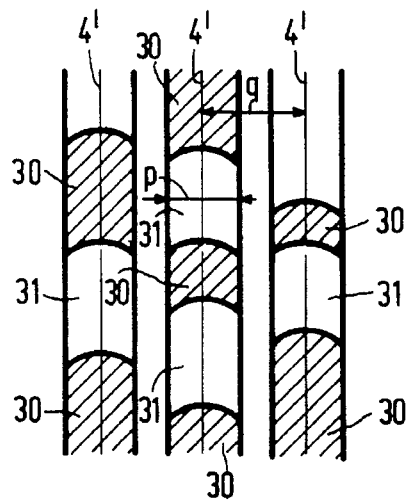
FIG. 4 shows a number of information patterns in adjacent track portions.

FIG. 4 shows patterns of domains 30 and 31 formed in a plurality of adjacent track portions of the servo track 4. The centers of the servo track portions bear the reference numeral 4'. The track pitch, i.e., the distance between the centers 4' of the servo track portions, bears the reference letter q. The dimensions of the domains in a direction perpendicular to the track portions direction is indicated by means of the letter p. Hereinafter, the domain dimensions in this direction will be referred to briefly as the "domain width".

Figure 5:
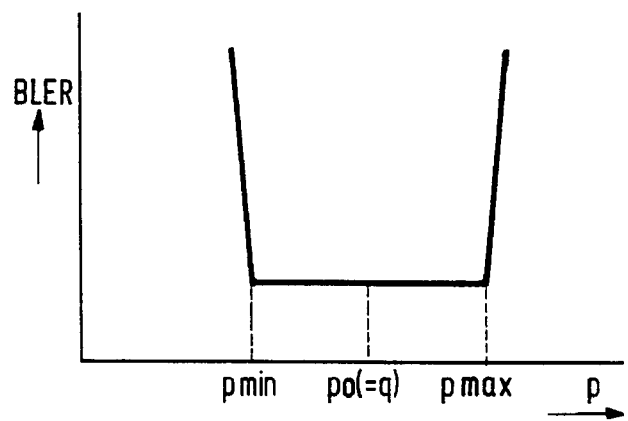
FIG. 5 gives the read reliability as a function of the write intensity.

FIG. 5 gives the BLER value as a function of the domain width p. It is found that within a range from pmin to pmax the BLER value substantially assumes a constant minimum value, while outside this range the BLER value increases rapidly. The domain width p which is equal to the track pitch q is found to be situated in the center of the range between pmin and pmax. In accordance with the invention, the domain width p during recording is selected to be equal to the track pitch q. In that case, the read reliability is least susceptible to domain-width variations, which are inevitable on account of the various tolerances in the recording system. Hereinafter, the domain width p corresponding to the track pitch q will be referred to as the optimum domain width po. The domain width can be adjusted simply by adapting the write-energy intensity of the radiation beam 15.

Figure 6:
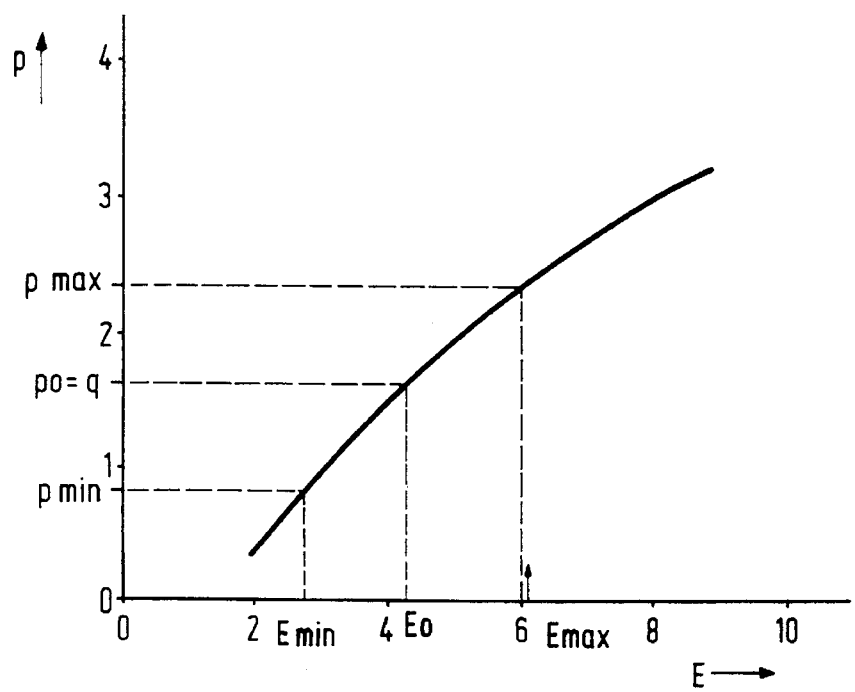
FIG. 6 gives the domain width as a function of the write intensity in the case of magneto-optical recording.

FIG. 6 gives the domain width p as a function of the write intensity E when the track 4 is scanned with a specific scanning velocity during recording. The write-intensity values corresponding to the domain width pmin, po and pmax are Emin, Eo and Emax, respectively. This makes clear that the optimum domain width can be adjusted by adjusting the write intensity to the corresponding value Eo. For a specific record carrier, it is possible, for example, to determine the value of the optimum write intensity in advance. Thus, before information is recorded on this record carrier, it is then possible, in principle, to adjust the write intensity of the recording apparatus to this value.

However, this presents the following problems:

1) There is a substantial spread in radiation sensity of the recording layers on different record carriers, even if they are made of the same magneto-optical material. This is caused by the generally adopted method of depositing the recording layer, such as, for example, sputtering.

2) The influence of the scanning velocity on the optimum write intensity Eo is considerable. This poses a problem particularly if the recording velocity for different recording apparatus vary substantially, as for example in recording apparatus for CD signals, in which the permissible recording velocity is between 1.2 m/s and 1.4 m/s.

3) In practice, accurately determining the actual radiation power is very problematic. The spread between power meters is of the order of magnitude of 10%. Moreover, different adjustment conditions may give rise to additional errors.

4) Finally, the shape of the scanning spot formed on the recording layer 6 by the radiation beam and the wavelength of the radiation also influence the optimum write intensity.

These problems mean that the variation of the optimum write intensity is so large that it is impossible to guarantee that when the write power has been adjusted to the predetermined power the domain width will be situated within the write-intensity range given in FIG. 5, in which the BLER value is small.

Figure 7A:
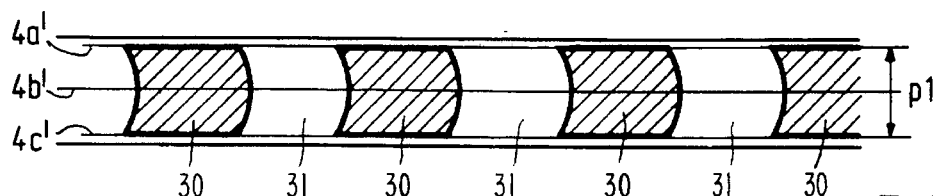
FIG. 7 consisting of FIG. (7a), FIG. 7(b), FIG. (7c) shows a number of information patterns to illustrate the invention.
Figure 7B:
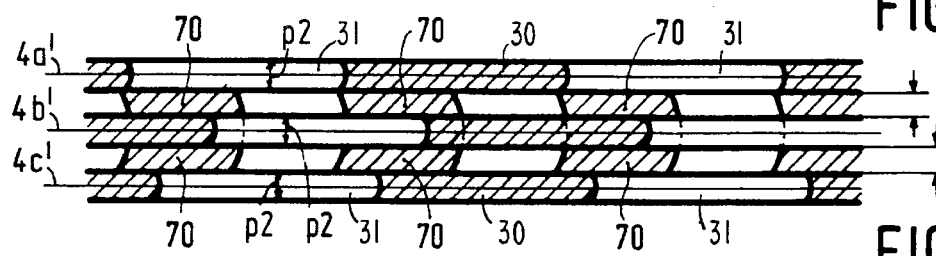

A method and a recording apparatus in accordance with the invention, enabling the optimum write intensity to be adjusted reliably and simply, will now be described with reference to FIG. 7, in which the reference numerals $4a'$, $4b'$ and $4c'$ denote the centers of three adjacent track portions of the track 4. In the first step of the method, a predetermined first pattern of magnetic domains 30 and 31, for example, a periodic pattern of the frequency f1, is recorded with a maximum write intensity E1 in the center track portion, as is illustrated in FIG. 7a. The write intensity E1 is selected so as to ensure that the corresponding domain width p1 is larger than the track pitch. Subsequently, a second pattern of magnetic domains 30 and 31, which can be distinguished from the first pattern, is recorded in all three track portions with a minimum write intensity E2 for which the associated domain width p2 is bound to be smaller than the track pitch. FIG. 7b shows the result of this recording, in which the second pattern is a periodic pattern of a frequency f2 lower than the frequency f1 of the first pattern. In the recording obtained, the first pattern, which was originally recorded in the center track portion, is partly overwritten by the second pattern.

Figure 7C:
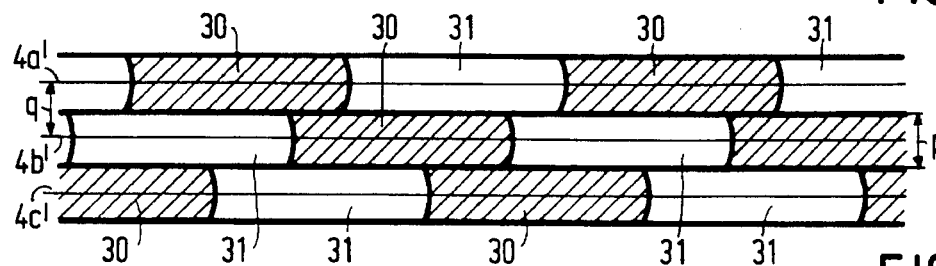

After recording of the second pattern in the three track portion the center track portion is read. Since the originally recorded first pattern is still partly present (as is indicated by the reference numeral 70) the read signal, will contain signal components corresponding to the first pattern in addition to signal components corresponding to the second pattern. The presence of the signal components corresponding to the first pattern is detected. Subsequently, the write intensity is increased and the second pattern is recorded again in the three track portion with this increased write intensity. Since as a result of the increased write intensity, the width of the recorded domains is larger than in the preceding recording of the second pattern, the originally recorded first pattern will be overwritten to a larger extent. When the center track portion is again read, the signal component in the read signal corresponding to the first pattern will have decreased. The method increasing the write intensity, of recording the second pattern with of increased write intensity, and of reading the center track portion is repeated continually. The read-signal component corresponding to the first pattern will decrease continually until the write intensity reaches a value for which the corresponding domain width has become so large that the originally recorded first pattern is overwritten completely. This is the case when the domain width p becomes equal to the track pitch q. In that case, the spacing between the two patterns recorded in the adjacent tracks has decreased to zero. By way of illustration, FIG. 7c shows the second in the three track portions for the situation in which the domain width p is equal to the track pitch q. As is shown in FIG. 7c, the originally recorded first pattern has disappeared completely for this track portion width. Thus, the optimum write intensity Eo can be obtained by recording the second pattern with increasing intensity and at the same time detecting the write intensity for which the signal component produced by the originally recorded first pattern disappears from the read signal produced by the center track portion.

Figure 8:
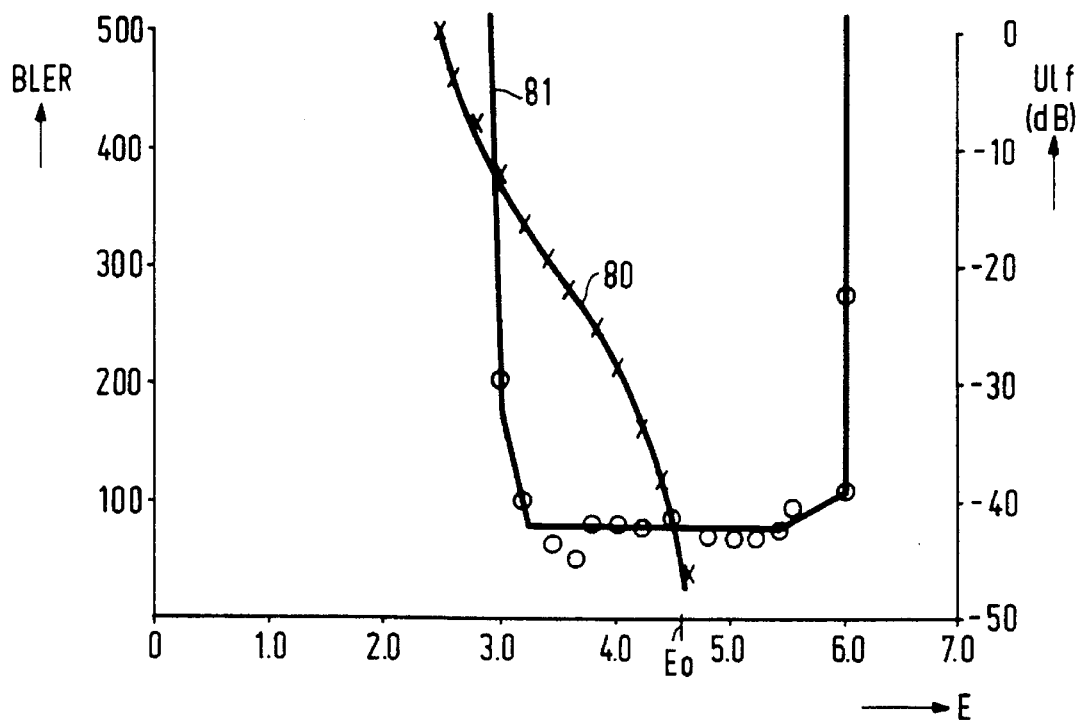
FIG. 8 shows a number of measurement results to illustrate the invention.

By way of illustration, the curve 80 in FIG. 8 gives the variation of the read-signal component Ulf corresponding to the originally recorded first pattern as a function of the write intensity E. Moreover, this figure gives the BLER values determined for the various write intensities. The curve 81 represents the variation of the BLER values. As is apparent from FIG. 8, the write intensity E for which the signal component Ulf disappears is situated substantially in the center of the write-intensity range in which the BLER value is minimal.

Figure 9:
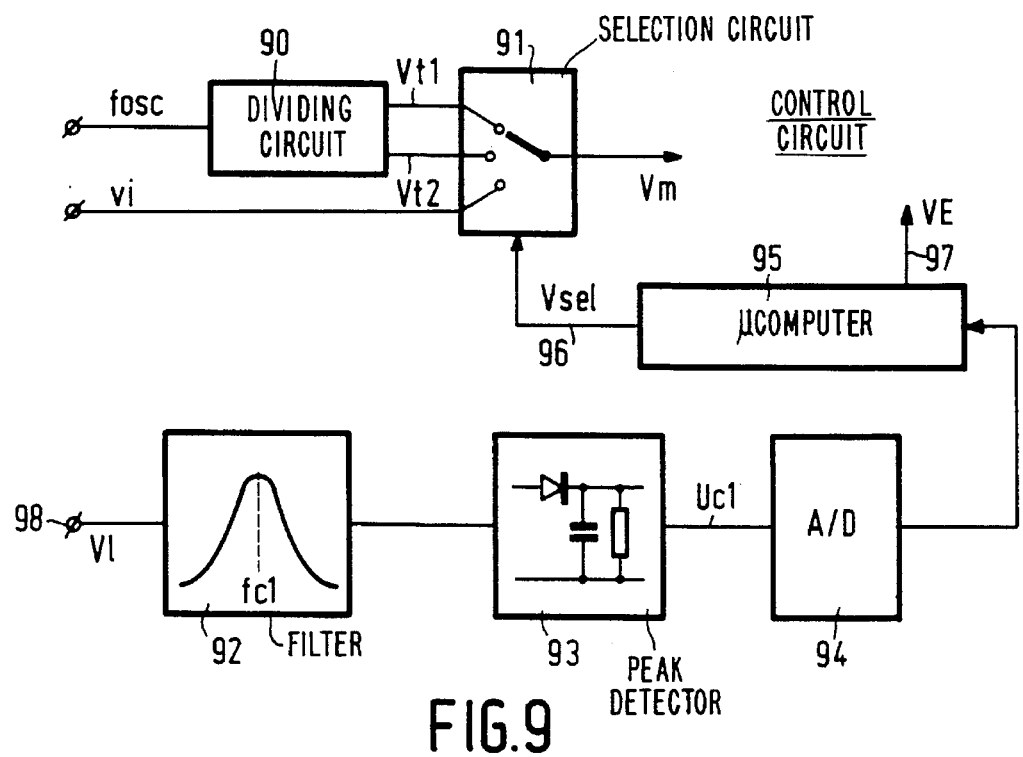
FIG. 9 shows an example of a control circuit for use in a recording apparatus in accordance with the invention.

FIG. 9 shows an example of the control circuit 19 of a recording apparatus 10 in accordance with the present invention, by means of which the optimum write intensity can be determined. The control circuit comprises a frequency-dividing circuit 90, which in a customary manner derives two periodic signals Vt1 and Vt2 of different frequency fc1 and fc2 respectively from a periodic signal of a frequency fosc. The two periodic signals Vt1 and Vt2 supplied by the dividing circuit 90 are applied to a first input and a second input, respectively, of a selection circuit 91 having three inputs. The signal Vi to be recorded is applied to a third input of the selection circuit 91. The selection circuit 91 is of a type which depending upon a control signal Vsel selects one of the three input signals and transfers the selected input signal to its output. The signal on the output of the selection circuit is applied to the magnetic-field modulator 16 (of FIG. 2) as the write signal Vm. The control circuit 19 further comprises a selective band-pass filter 92, which is tuned to the frequency fc1 of the signal Vt1. An input 98 of the selective band-pass filter 92 is coupled to the write/read head 14 (of FIG. 2) for recording the read signal V1. An output signal of the selective filter 92 is applied to a peak detector 93 to determine the peak value of the applied signal, which has been filtered by means of the, selective filter 92. A signal Uc1, which is representative of the peak value, is digitized by means of an analog-to-digital converter 94. The digitized peak value is applied to a microcomputer 95. The microcomputer 95 is coupled to the selection circuit 91 via a signal line 96 to supply the control signal Vsel to the selection circuit 96.

The microcomputer 95 is also coupled to the read/write head 14 (of FIG. 2) to apply a control signal VE for adjusting the intensity of the beam 15. The microcomputer 95 further comprises control outputs and inputs (not shown) for controlling the search for location of addressed track portions, as is described, for example, in Netherlands Patent Application NL-A 880015, which is incorporated herewith by reference. The microcomputer 95 is loaded with a program for determining the optimum write intensity Eo.

Figure 10:
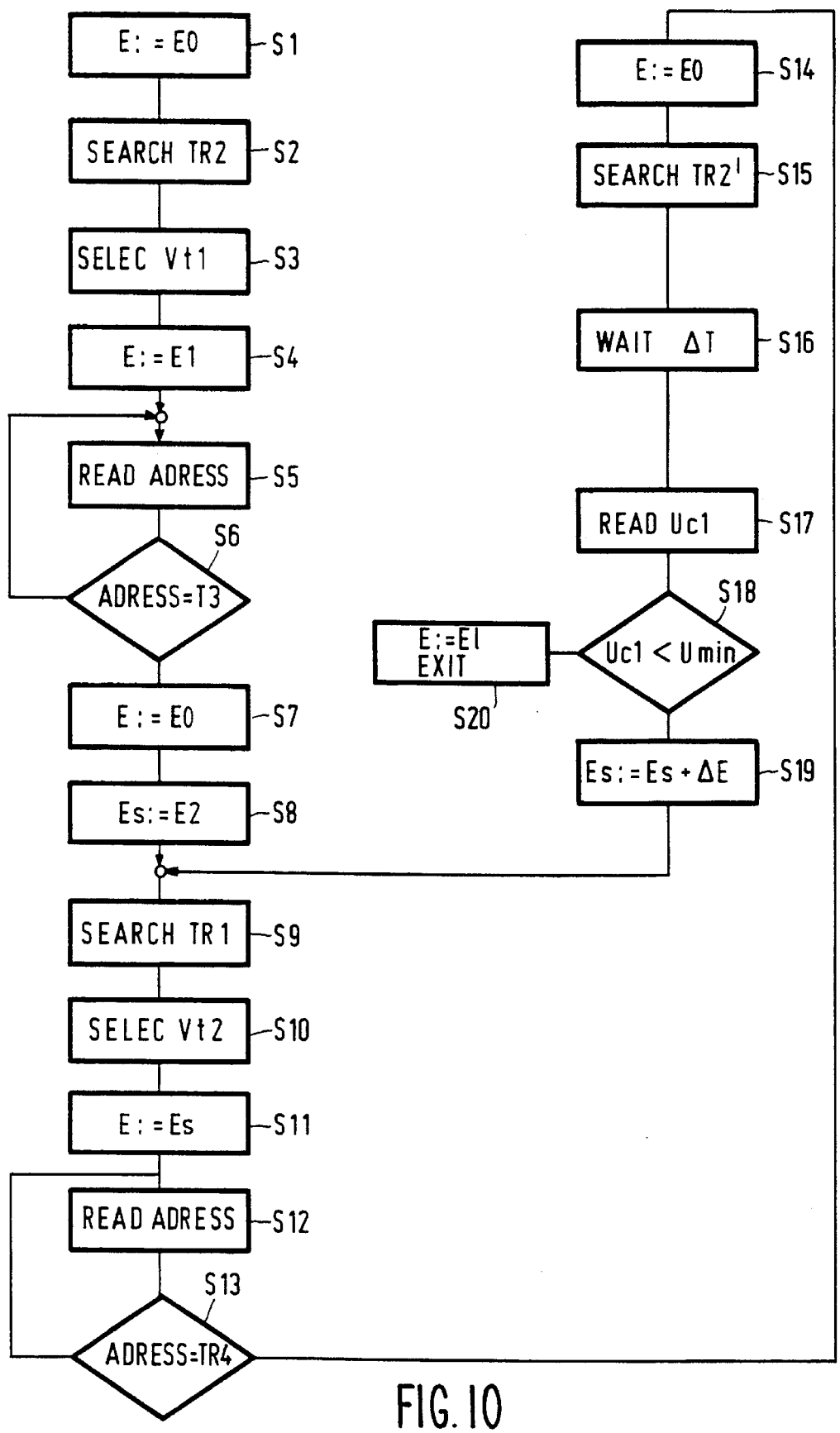
FIG. 10 is a flow chart of a program for the microcomputer which forms part of the control circuit.
Figure 11:
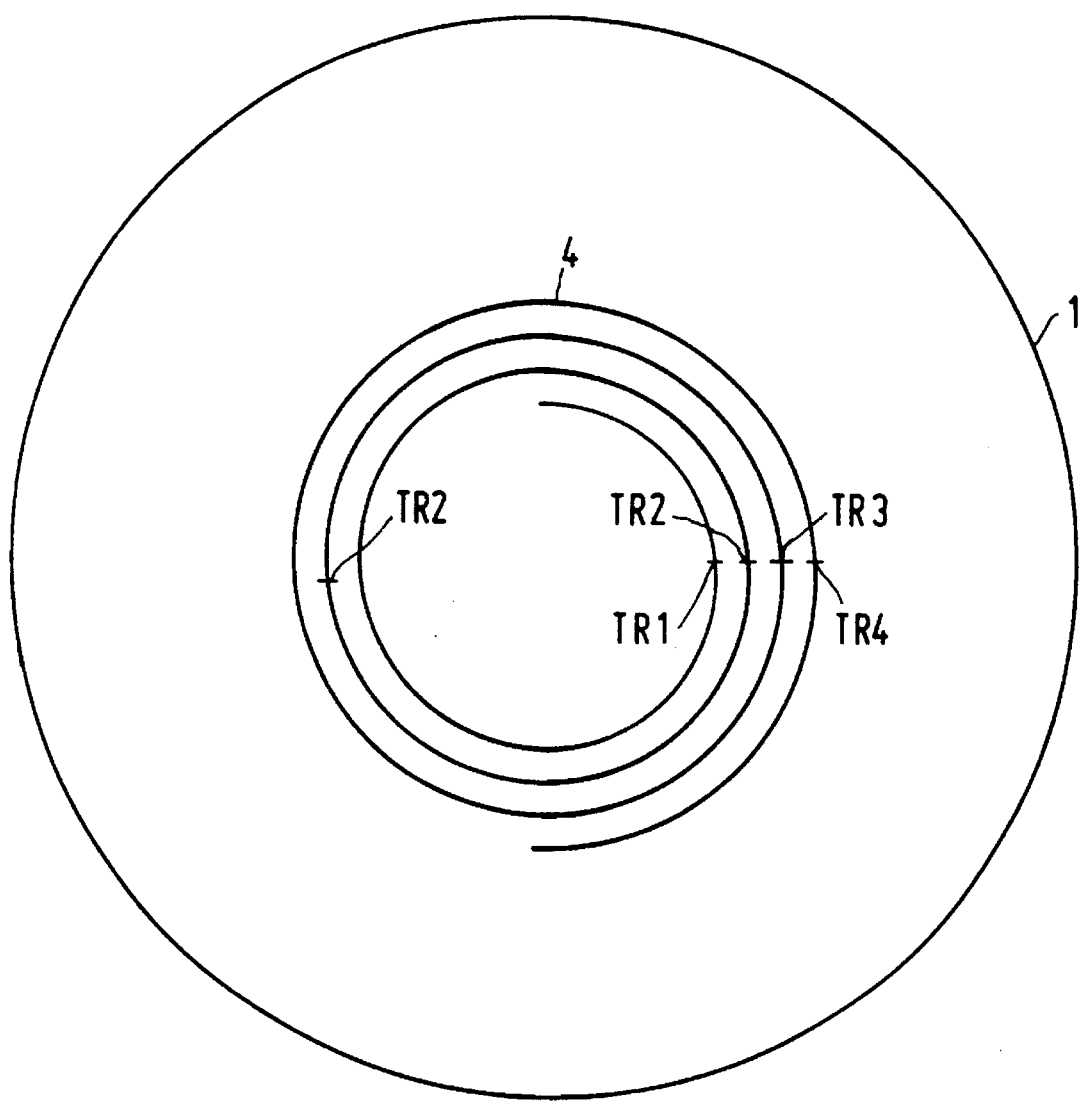
FIG. 11, in order to illustrate the invention, shows an area on the record carrier which is suitable for recording the test signals.

A suitable program will be now described in detail with reference to FIGS. 10 and 11. FIG. 10 shows the flow chart of the program and FIG. 11 shows the track portions of the servo track 4 in which the patterns for determining the optimum write intensity Eo can be recorded. These track portions comprise three contiguous turns of the spiral servo track 4. The address information is recorded in the turns, for example as a preformed modulation of the servo track 4, as is described in for example, the afore-mentioned Netherlands Patent Application NL-A 8800151. The start addresses of the three turns are designated TR1, TR2 and TR3, respectively. Halfway along the turn, having the start address TR2, an address TR2' is recorded. The end of the third turn is indicated by the address TR4. The program, whose flow chart is given in FIG. 10 begins with a first step in which the intensity of the write beam E is set to a read intensity E0, which is low enough to preclude variations of the magnetization in the recording layer 6. Subsequently, the track portion indicated by the address TR2 is located in step S2. In step S3, the selection circuit 91 is controlled in such a way that the test signal Vt1 of the frequency fc1 is selected as the write signal Vm. In step S4, the beam intensity is set to the maximum write intensity E1, after which recording of the signal Vt1 in the form of a pattern of wide domains in the track portion indicated by the address TR2 begins. During recording, the addresses are read from the track being scanned in step S5. In step S6 a determination is made based upon the information being read as to whether the beginning of the track portion indicated by the address TR3 is reached. If not, step S5 is repeated. If the track portion is reached, the intensity of the beam 15 is again set to the read intensity E0 during step S7. Subsequently, in step S8, a value Es which is representative of the write intensity is equalized to the value which is representative of the minimum write intensity E2. After this, in step S9, the track portion indicated by the start address TR1 is located. In step S10, the selection circuit 91 is controlled in such a way that the test signal Vt2 of the frequency fc2 is applied to the magnetic-field modulator 16 as the write signal Vm. Subsequently, the intensity of the beam 15 is adjusted to the intensity specified by the value Es, after which recording of the test signal Vt2 in the form of narrow domains begins, During recording, steps S12 and S13 are carried out, in which a determination (i.e., a check) is made as to whether the track portion having the start address TR4 is reached. If not, recording is continued. If the track portion is reached, step S14 is carried out, in which the intensity of the radiation beam is again set to the read intensity E0. Subsequently, in step S15, the track portion indicated by the start address TR2' is located and this track portion is read for a specific time interval ΔT. At the end of the interval ΔT, the digitized value of Uc1 is read while step S17 is performed. In step S18, the value of Uc1 read is compared with a very small reference value Umin, which is, for example, 40 dB below the signal value corresponding to a non-overwritten test signal Vt1. If the value of Uc1 exceeds the value Umin, the value of Es is incremented by an adaptation value ΔE in the step S19, and, subsequently the program proceeds with the step S9. However, if the value of Uc1 is smaller than the reference value Umin, this means that the first test signal has been overwritten completely, and, consequently, the intensity value Es corresponds to the optimum value Eo. After this, the intensity of the beam 15 is again set to the read intensity Eo in step S20, and the program is terminated. If subsequently the signal Vi is to be recorded, the microcomputer 75 controls the selection circuit 91 in such a way that the signal Vc is applied to the magnetic-field modulator 16 as the write signal, Vm, and the write intensity of the beam 15 is adjusted to the optimum value Eo, equal to the most recently obtained value of Es.

In the present embodiment, the second signal Vt2 is each time recorded over the whole length of the three turns of the track 4, designated by the start addresses TR1, TR2 and TR3, respectively, after an increase in write intensity. However, it is alternatively possible to divide the three turns into a number of addressable sectors. Subsequently, the test signal Vt2 is recorded within a sector in each of the three track portions for which the write intensity of the various sectors can be different, and, moreover, the write intensities used for the various sectors are stored in a memory. After this, the sectors of the center turn can be read and the read-signal components corresponding to the test signal Vt1 can be determined for the various sectors. The value of the optimum write intensity Eo can then be derived from these measurement results and the stored write intensities.

In the above-discussed magneto-optical recording apparatus, a constant-intensity beam is directed towards the record carrier during recording. However, it is to be noted that the invention may also be utilized in magneto-optical recording apparatus in which the radiation energy is applied in the form of periodic radiation pulses of constant intensity, as is described, for example, in Netherlands Patent Application NL-A 8703011 or NL-A 8801205.

It must also be noted that the invention is not limited to a magneto-optical recording apparatus in which the information is recorded by means of a modulated magnetic field. The invention can also be applied to magneto-optical recording systems in which the information is recorded by first scanning the recording layer with a radiation beam of constant intensity during which, the scanned portion of the recording layer is exposed to a constant magnetic field, so that a track of uniform magnetization is obtained (erasing), and by subsequently reversing the direction of the magnetic-field and scanning the track of uniform magnetization with a radiation beam whose intensity is modulated in conformity with the signal to be recorded, as is described, for example, in the above-mentioned "Philips' Technical Review". In such case, the test signal Vt2 is suitably not a periodic signal but a d.c. signal, and the test signal Vt1 is a periodic signal.

Moreover, it is to be noted that although the invention is very suitable for use in magneto-optical recording it is not limited to this recording method. For example, the invention may also be applied to what is referred to as "erasable phase-change recording" in which by exposure of the recording layer to a radiation beam the structure of the recording layer can be changed from amorphous to crystalline or from crystalline to amorphous depending on the scanning method used. It is then possible to first record a periodic test signal Vt1, which is subsequently overwritten by a d.c. test signal Vt2 with a number of different write intensities.

Finally, it is to be noted that the invention is not limited to the use in conjunction with disc-shaped record carriers having a concentric track pattern (e.g., a continuous spiral track or separate multiple concentric tracks). The invention may also be used in conjunction with record carriers on which the information is recorded in straight tracks.

We claim:

1. A method of recording an information signal on a record carrier of a rewritable type by scanning the record carrier with a radiation beam which produces information patterns of optically detectable marks in track portions thereon having a substantially uniform track pitch in accordance with the information signal, the beam being operable at a plurality of write intensities including a maximum write intensity; the method comprising the steps of:

recording a first test signal in a first track portion at the maximum write intensity of the beam;

recording a second test signal in the first track portion over the first test signal and in opposing track portions situated adjacent to the first track portion at at least one of the write intensities;

reading-out at least one read-out signal from the first track portion which includes the second test signal and detecting whether the at least one read-out signal has first test signal components therein associated with the first test signal;

determining an optimal write intensity of the beam which causes the marks to have a dimension in a direction perpendicular to a corresponding track portion direction which is substantially the same as the track pitch by determining based on the at least one read-out signal a lowest write intensity of the beam required to substantially remove all first test signal components therefrom; and setting the beam to the optimal write intensity for recording the information signal.

2. The method as claimed in claim 1, wherein the marks are magnetic domains produced by local heating of a recording layer of the record carrier by the beam, the recording layer being adapted for magneto-optical recording, and exposing a heated portion of the recording layer to a magnetic field directed substantially perpendicular to the recording layer.

3. The method as claimed in claim 2, further comprising modulating the magnetic field in conformity with the information signal to be recorded.

4. The method as claimed in claim 1, wherein the first and second test signals are periodic.

5. The method as claimed in claim 1, wherein the second test signal is recorded with the beam at various different intensities from a minimum write intensity of the beam upto and including the optimal write intensity of the beam.

6. The method as claimed in claim 1, wherein the second test signal is recorded a plurality of times with the beam being set at a substantially constant write intensity, the substantially constant intensity increasing progressively each time the second test signal is recorded from a minimum write intensity of the beam upto and including the optimal write intensity of the beam.

7. The method as claimed in claim 6, wherein the optimal write intensity is determined based upon a plurality of read-out signals, one read-out signal being obtained each time the second test signal is recorded at a different write intensity.

8. The method as claimed in claim 4, wherein the first and second test signals are periodic signals of different frequencies.

9. An apparatus for recording an information signal on a record carrier of a rewritable type, the apparatus comprising;

write means for recording signals, including the information signal, on the record carrier by scanning the record carrier with a radiation beam which produces information patterns of optically detectable marks in track portions thereon having a substantially uniform track pitch, the beam being operable at a plurality of write intensities including a maximum write intensity;

read means for reading from the record carrier at least one read-out signal which has been recorded in at least one track portion;

optimal write intensity selection means for selecting an optimal write intensity of the beam which causes the marks to have a dimension in a direction perpendicular to a corresponding track portion direction which is substantially the same as the track pitch, said optimal write intensity selecting means comprising:

(a) means for generating first and second test signals;
   (b) control means adapted to:
      (i) control said write means to record the first test signal in a selected track portion at the maximum write intensity of the beam, and to record the second test signal in the selected track portion over the first test signal and in opposing track portions adjacent to the selected track portion at at least one write intensity; and
      (ii) control said read means to read-out at least one read-out signal from the selected track portion which includes the second test signal;
   (c) means for detecting whether a read-out test signal from the selected track portion including the second test signal has first test signal components therein which correspond to the first test signal;

selection means for determining the optimal write intensity by determining based on the at least one read-out test signal from the selected track portion including the second test signal a lowest write intensity required to substantially remove all first test signal components therefrom; and means for controlling said write means so as to produce the beam at the optimal write intensity during recording of the information signal.

10. The apparatus as claimed in claim 9, wherein the first and second test signals are periodic signals.

11. The apparatus as claimed in claim 10, wherein the apparatus is adapted for magneto-optical recording and further comprises means for generating a magnetic field in a track portion being scanned by the beam.

12. The method as claimed in claim 10, wherein the first and second test signals are periodic signals of different frequencies.

13. The apparatus as claimed in claim 9, wherein the apparatus is adapted for magneto-optical recording, and further comprises means for generating a magnetic field in a track portion being scanned by the beam.

14. A method of recording a new information pattern over an already recorded information pattern on an optically readable record carrier of an overwritable type, the recorded information pattern including recorded optically detectable marks formed in track portions of the record carrier having a substantially uniform track pitch; the method comprising:

scanning at least one track portion with a radiation beam having an intensity so as to form new optically detectable recording marks thereon over recorded optically detectable marks in accordance with the new information pattern; and controlling the intensity of the beam so that the new optically detectable recording marks formed thereby have a dimension in a direction perpendicular to a corresponding track portion direction which is substantially the same as the track pitch and as such increases read reliability of the new information pattern.

15. The method as claimed in claim 14, wherein the new optically detectable recording marks are magnetic domains produced by local heating of a recording layer of the record carrier by the beam, the recording layer being adapted for magneto-optical recording, and exposing a heated portion of the recording layer to a magnetic field directed substantially perpendicular to the recording layer.

16. The method as claimed in claim 15, further comprising modulating the magnetic field in conformity with the new information pattern to be recorded.

17. An apparatus for recording a new information pattern over an already recorded information pattern on an optically readable record carrier of an overwritable type, the recorded information pattern including recorded optically detectable marks formed in track portions of the record carrier having a substantially uniform track pitch; the apparatus comprising:

means for scanning at least one track portion with a radiation beam having an intensity so as to form new optically detectable recording marks thereon over recorded optically detectable marks in accordance with the new information pattern; and means for controlling the intensity of the beam so that the new optically detectable recording marks formed thereby have a dimension in a direction perpendicular to a corresponding track portion direction which is substantially the same as the track pitch and as such increases read reliability of the new information pattern.

18. The apparatus as claimed in claim 17, wherein the apparatus is adapted for magnetic-optical recording, and further comprises means for generating a magnetic field in the at least one track portion being scanned by the beam.

19. An optically readable record carrier of an overwritable type, comprising track portions of substantially uniform track pitch, which track portions have an information pattern of optically detectable marks recorded thereon, the marks having a dimension in a direction perpendicular to a corresponding track portion direction which is substantially the same as the track pitch and thereby increases read reliability of the information pattern.

20. The record carrier as claimed in claim 19, wherein the record carrier is of a magneto-optical type and the marks comprise magnetic domains having a direction of magnetization substantially perpendicular to a recording plane of the record carrier.

21. The record carrier as claimed in claim 19, wherein the marks are magnetic domains produced by local heating of a recording layer of the record carrier by a radiation beam, the recording layer being adapted for magneto-optical recording, and exposing a heated portion of the recording layer to a magnetic field directed substantially perpendicular to the recording layer.

22. The record carrier as claimed in claim 19, wherein the track portions are substantially concentric.

23. The record carrier as claimed in claim 22, wherein the track portions are arranged as a continuous spiral servo track which acts as the tracking structure.

24. The record carrier as claimed in claim 22, wherein each of the track portions is substantially circular and separate from the other track portions.

25. The record carrier as claimed in claim 19, wherein the track portions are substantially longitudinal and substantially parallel.

26. A method of recording a new information pattern over an already recorded information pattern on an optically readable record carrier of an overwritable type, the recorded information pattern including recorded optically detectable and overwritable marks formed in track portions of the record carrier having a substantially uniform track pitch, the method comprising:

scanning at least one of the track portions with a radiation beam having an intensity so as to form new optically detectable and overwritable recording marks thereon over the recorded optically detectable and overwritable marks in accordance with the new information pattern; and controlling the intensity of the beam so that the new optically detectable and overwritable recording marks formed thereby each have a dimension in a direction perpendicular to a corresponding track portion direction which is substantially the same as the track pitch and as such increases read reliability of the new information pattern.

27. An apparatus for recording a new information pattern over an already recorded information pattern on an optically readable record carrier of an overwritable type, the recorded information pattern including recorded optically detectable and overwritable marks formed in track portions of the record carrier having a substantially uniform track pitch, the apparatus comprising:

means for scanning at least one of the track portions with a radiation beam having an intensity so as to form new optically detectable and overwritable recording marks thereon over the recorded optically detectable and overwritable marks in accordance with the new information pattern; and means for controlling the intensity of the beam so that the new optically detectable and overwritable recording marks formed thereby each have a dimension in a direction perpendicular to a corresponding track portion direction which is substantially the same as the track pitch and as such increases read reliability of the new information pattern.

28. An optically readable record carrier of an overwritable type, comprising track portions of substantially uniform track pitch having an information pattern of optically detectable and overwritable marks recorded thereon, wherein each of the optically detectable and overwritable marks has a dimension in a direction perpendicular to a corresponding track portion direction which is substantially the same as the track pitch, thereby increasing read reliability of the information pattern.

29. The record carrier as claimed in claim 28, wherein the track portions are substantially concentric.

30. The record carrier as claimed in claim 29, wherein the track portions are arranged as a continuous spiral servo track.

31. The record carrier as claimed in claim 29, wherein each of the track portions is substantially circular and separate from the other track portions.

32. The record carrier as claimed in claim 28, wherein the track portions include optically detectable servo patterns which serve as a tracking structure.

33. The record carrier as claimed in claim 28, wherein the track portions are substantially longitudinal and substantially parallel.

* * * * *